United States Patent

[11] 3,599,414

[72] Inventors Lev Judelevich Polyakovsky
13 Parkovaya ulitsa, 27, korpus 4, kv. 51;
Lidia Petrovna Kovaeva, Varshavskoe shosse, 9/1, kv. 40; Stanislav Markovich Balandin, Nikolo Yamsky pereulok, 4/6, kv. 64; Igor Vladimirovich Kornev, Pogodinskaya ulitsa, 14/16, kv. 28, all of Moscow, U.S.S.R.
[21] Appl. No. 833,965
[22] Filed July 17, 1969
[45] Patented Aug. 17, 1971

[54] TWISTING AND FORMING DEVICE FOR A PNEUMATIC SPINNING SYSTEM
2 Claims, 1 Drawing Fig.
[52] U.S. Cl. ................................................. 57/58.89, 57/129
[51] Int. Cl. ............................................ D01h 7/00, F16c 17/16
[50] Field of Search ............... 57/58.89, 58.93, 129, 130, 133 308/162, 228

[56] References Cited
UNITED STATES PATENTS
3,481,129  12/1969  Shepherd et al. ........... 57/58.89
3,481,130  12/1969  Kubovy et al. .............. 57/58.89
FOREIGN PATENTS
1,085,184  9/1967  Great Britain ................ 57/58.89

Primary Examiner—Donald E. Watkins
Attorney—Waters, Roditi, Schwartz & Nissen

ABSTRACT: A twisting and forming device for a pneumatic spinning system includes a twisting and forming bowl supported on a shaft mounted for rotation in a pair of radial bearings adapted to be lubricated by a compressed air and also a thrust bearing assembly. The radial bearings are rigidly connected with each other and are supported on an elastic shock damping member common to both of them, the thrust bearing assembly also being adapted to be lubricated by compressed air. The thrust bearing assembly is disposed between the twisting and forming bowl and the upper of the two radial bearings, a bearing plate of the thrust bearing assembly being formed as an annular ring mounted around the rotary shaft of the device.

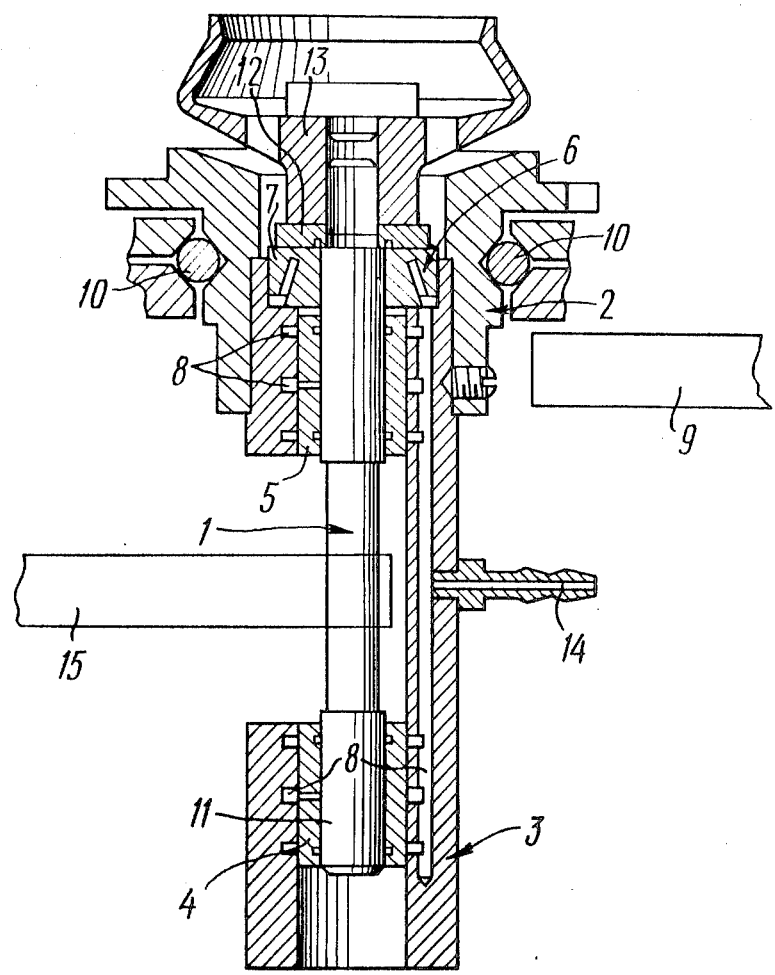

TWISTING AND FORMING DEVICE FOR A PNEUMATIC SPINNING SYSTEM

The present invention relates to spinning machines operating on a pneumatic spinning principle; and, more particularly, it relates to pneumatic spinning apparatus.

There are known pneumatic spinning apparatus comprising a twisting and forming bowl carried by a shaft mounted for rotation in radial plain bearings lubricated by compressed air, which bearings are supported in separate elastic shock-damping members, the apparatus further comprising a thrust bearing in the form of a cone-shaped member carried by the end portion of the shaft, this cone-shaped member engaging a flat bearing plate made from a low-friction material.

The main disadvantage of such known apparatus is the insufficient stability of the elastic shock-damping members, whereby, in the course its of operational life, the relative positioning of the radial bearings may become uncontrollably varied, with the resultant failure of these radial bearings.

When such known apparatus is to be stored or transported, special safety measures must be taken to maintain the proper positioning of the radial bearings, which introduces additional inconvenience.

Additionally, the cone-shaped thrust bearing member which rotates in engagement with the flat bearing plate is quickly worn out, and thus has a very limited operational life.

It is, therefore, the main object of the present invention to provide a novel device which will eliminate the influence of the unstable positioning of the elastic shock-damping members on the relative positioning of the radial bearings lubricated by compressed air.

It is another object of the present invention to prolong the operational life of the thrust bearing and to make the device easily handled, operated, transported and stored.

These objects are attained in a device for pneumatic spinning, comprising a twisting and forming bowl carried by a shaft mounted for rotation in radial bearings lubricated by compressed air and a thrust bearing, in which device, in accordance with the present invention, said radial bearings are rigidly connected to each other and are supported by a common elastic shock-damping member, whereas said thrust bearing is also lubricated by compressed air and is positioned intermediate said bowl and the upper of said radial bearings.

It is preferred that the flat bearing plate cooperating with said thrust bearing be shaped as an annular ring mounted on said shaft.

Since the radial bearings in the device embodying the present inventions are rigidly connected to each other, any variations in the size and shape of the elastic shock-damping member, which are bound to manifest themselves in the course of operational life, will not affect the relative positioning of these radial bearings.

Since the thrust bearing assembly in a device embodying the present invention is positioned intermediate the bowl and the upper of the radial bearings, the device, as a whole, can be readily disassembled, whereby its inspection and cleaning are facilitated, and, moreover, the thrust bearing assembly serves an additional means blocking the passage of cotton lint and dust from the spinning chamber toward the upper of the radial bearings.

The device embodying the invention considerably improves its reliability, extends the operational life of the bearing plate and facilitates the maintenance of the spinning machine incorporating the device.

The present invention will be better understood from the following detailed description of an embodiment thereof, with due reference being had to the accompanying drawing the sole figure of which is an axial sectional view of a device embodying the invention.

Referring now to the drawing, a pneumatic spinning device includes a rotary structure generally designated by numeral 1 and a stationary structure designated by numeral 2.

The stationary structure 2 includes a housing member 3 having two radial bearings 4 and 5 rigidly secured therein, the bearings being made from graphite impregnated with either lead or bronze. The housing 3 also supports a thrust bearing member 6 whose bearing end surface 7 is made from porous graphite.

The housing 3 has passages 8 therein for supplying compressed air to the bearings 4, 5, and 6, the air serving as a lubricant for these bearings.

The housing 3 is supported on the frame 9 of the machine by means of an elastic shock-damper 10 which, therefore, is common for both bearings 4 and 5.

The rotary structure 1 of the device includes a shaft 11 having a bearing plate 12 secured thereto in the upper portion thereof, the plate 12 being shaped as an annular ring member. A bowl 13 is press-fit onto the shaft 11 above the bearing ring 12.

The herein disclosed device for pneumatic spinning operates as follows: compressed air under pressure (about 0.3 to 0.5 atm. is supplied to the connection 14, wherefrom it flows through the air supply passages 8 into the radial bearings 4 and 5 and also into the porous thrust bearing 7 where its pressure lifts the bearing ring 12 off the bearing surface 6. While passing through the radial bearings 4 and 5, the air effects the lubrication of the bearings. As a driving belt 15 is power-driven in operation, it drives the shaft 11 in rotation, together with the bowl 13. Any vibrations of the rotating shaft 11 are taken up and damped by the shock-damping member 10. During operation the shaft 11 does not actually contact the internal surface of the radial bearings 4 and 5.

What I claim is:

1. A twisting and forming device for a pneumatic spinning system, comprising: a twisting and forming bowl; a substantially vertically extending rotary shaft supporting said twisting and forming bowl; a pair of radial bearings adapted to be lubricated by compressed air, said radial bearings being rigidly connected with each other, said shaft being mounted for rotation in said bearings; an elastic shock-damping member supporting said pair of radial bearings; and a thrust bearing assembly adapted to be lubricated by compressed air, said thrust bearing assembly being disposed intermediate of said twisting and forming bowl and the upper of said pair of radial bearings.

2. A twisting and forming device, as set forth in Claim 1, wherein said thrust bearing assembly comprises a bearing plate in the form of an annular ring mounted around said vertically extending rotary shaft.